(12) United States Patent  
Goodwin et al.

(10) Patent No.: US 11,929,077 B2  
(45) Date of Patent: Mar. 12, 2024

(54) MULTI-STAGE SPEAKER ENROLLMENT IN VOICE AUTHENTICATION AND IDENTIFICATION

(71) Applicant: DTS, Inc., Calabasas, CA (US)

(72) Inventors: Michael M. Goodwin, Scotts Valley, CA (US); Teodora Ceanga, Brasov (RO); Eloy Geenjaar, Los Gatos, CA (US); Gadiel Seroussi, Cupertino, CA (US); Brandon Smith, Kirkland, WA (US)

(73) Assignee: DTS Inc., Calabasas, CA (US)

( * ) Notice: Subject to any disclaimer, the term of this patent is extended or adjusted under 35 U.S.C. 154(b) by 182 days.

(21) Appl. No.: 17/131,702

(22) Filed: Dec. 22, 2020

(65) Prior Publication Data

US 2021/0193150 A1 Jun. 24, 2021

Related U.S. Application Data

(60) Provisional application No. 62/952,926, filed on Dec. 23, 2019.

(51) Int. Cl.
*G10L 17/04* (2013.01)
*G06F 21/32* (2013.01)
*G10L 17/24* (2013.01)

(52) U.S. Cl.
CPC .............. *G10L 17/04* (2013.01); *G06F 21/32* (2013.01); *G10L 17/24* (2013.01)

(58) Field of Classification Search
None
See application file for complete search history.

(56) References Cited

U.S. PATENT DOCUMENTS

| | | | |
|---|---|---|---|
| 9,990,926 B1 * | 6/2018 | Pearce | G10L 15/05 |
| 10,490,195 B1 * | 11/2019 | Krishnamoorthy | G10L 17/22 |
| 2005/0273333 A1 * | 12/2005 | Morin | G10L 17/22 |
| | | | 704/E17.015 |
| 2017/0092278 A1 * | 3/2017 | Evermann | G10L 15/22 |
| 2019/0327524 A1 * | 10/2019 | Milavsky | H04N 21/4667 |
| 2019/0341057 A1 * | 11/2019 | Zhang | G01N 21/8983 |
| 2020/0110864 A1 * | 4/2020 | Casado | G10L 17/06 |
| 2020/0312337 A1 * | 10/2020 | Stafylakis | G10L 17/00 |
| 2022/0180859 A1 * | 6/2022 | Park | G10L 21/0272 |
| 2022/0224792 A1 * | 7/2022 | Horton | H04M 3/38 |

OTHER PUBLICATIONS

Shan, Zhenyu, Yingchun Yang, and Ruizhi Ye. "Natural-emotion GMM transformation algorithm for emotional speaker recognition." Eighth Annual Conference of the International Speech Communication Association. 2007. (Year: 2007).*

* cited by examiner

*Primary Examiner* — Douglas Godbold  
(74) *Attorney, Agent, or Firm* — Lerner David LLP (57) ABSTRACT

Embodiments of systems and methods for user enrollment in speaker authentication and speaker identification systems are disclosed. In some embodiments, the enrollment process includes collecting speech samples that are examples of multiple speech types spoken by a user, computing a speech representation for each speech sample, and aggregating the example speech representations to form a robust overall representation or user voiceprint of the user's speech.

17 Claims, 5 Drawing Sheets

MULTI-STAGE SPEAKER ENROLLMENT IN VOICE AUTHENTICATION AND IDENTIFICATION

RELATED APPLICATION AND PRIORITY CLAIM

This application is related to and claims priority to U.S. Provisional Application No. 62/952,926, filed on Dec. 23, 2019 and titled "Structured Enrollment for Improved Voice Authentication," which is hereby incorporated by reference in its entirety.

BACKGROUND

Voice interfaces between humans and machines are becoming more prevalent.

One common voice interface is based on speech recognition. For example, on many customer service telephone lines a caller's voice is interpreted automatically to navigate through service options. As another example, voice is increasingly used as an input modality for textual communication and for command input and search queries on various user devices. In such scenarios, recognition of the words spoken by the user is required for a successful human-machine interaction.

In some voice interface scenarios the talker's identity itself, as opposed to recognizing what the talker said, is essential. For instance, positive identification or authentication of a user based on their voice can be incorporated in a system as a prerequisite to performing a requested protected action. One such use case is authenticating a caller's voice when they request a transaction in a certain financial account by telephone. In this case the transaction may only be permitted if the caller's voice matches an official prior sample of the voice of the financial account's owner. Another example is device security, where a personal device (such as a smartphone or tablet computer) contains a feature whereby the device can be unlocked by the owner's voice.

Accurate voice identification may also be used to protect individuals or property. One example is a voice-controlled door lock that only allows access to certain authorized individuals. In such a door-lock system a user requests entry vocally. The system then analyzes the spoken request to determine if the speaker is among the set of allowed entrants. If so, the door unlocks and the speaker is granted entry. On the other hand, if there is no match the door does not unlock and entry is denied. Some voice interface systems may leverage identification of the speaker for reasons other than authentication for security or safety. For instance, a speaker may be identified so as to customize a system's response for the identified speaker. As another example, a system may identify various speakers in a conversation as part of an automatic transcription process.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the multi-stage enrollment voice authentication and identification system and method include both an enrollment process and an inference process. The enrollment process includes collecting speech samples from the user, analyzing the user's speech samples to generate a salient representation, coupling the representation with relevant identifying information about the user, and storing the coupled data in a user enrollment database. One problem with existing systems occurs if a user's manner of speaking in a phrase being used for authentication or identification is different from that user's manner of speaking during the enrollment process. For example, if the user enrolls in a monotone voice but attempts to authenticate with a dynamic voice, the authentication may fail due to the mismatch. Embodiments of the system and method disclosed herein address this issue by eliciting a variety of speech types and patterns during the enrollment process. This enables embodiments of the system and method to derive a representation of the user's voice for which inference will perform robustly for a variety of vocalizations that may be used for authentication or identification. Embodiments of the system and method ensure robustness of inference decisions to speech variations. In other words, the inference result for a given talker does not depend on the type of speech the talker submits to the system. Embodiments of the system and method may be used to ensure robustness to speech variations in both text-dependent and text-independent speaker authentication and identification systems.

Embodiments of the multi-stage enrollment voice authentication and identification system and method disclosed herein include a novel enrollment process that is structured so as to require the enrolling user to speak in a variety of different ways during the enrollment process. This is achieved in part by using a multi-stage enrollment process that has the enrolling user speak a variety of different sentence types. For example, the enrolling user may be asked to speak narrative statements, issue command phrases, and ask questions during different phases of the enrollment. This diversity of enrollment speech ensures that embodiments of the system and method will have a representation of each speaker in the enrollment database that captures the variety of speech that may be encountered by the system in authentication or identification of the various enrolled speakers. Moreover, the rich enrollment representation ensures that embodiments of the system and method are robust to a variety of user speech patterns. In other words, it will not require that the user speak in the same manner for authentication or identification as for enrollment.

Embodiments of the multi-stage enrollment voice authentication and identification system and method ensure that a range of speech types are captured for each enrolling user by guiding the enrolling user through a series of particular stages. Each stage encourages the submission of a certain type of speech. In some embodiments this includes various sentence types, including declarative sentences, imperative sentences, interrogatory sentences, and exclamatory sentences. In some embodiments the submitted utterances are based on a provided example, meaning that the user is given a text phrase of a particular type to speak. In other embodiments the speech spoken is freely chosen by the user, known as a free-response utterance. In some embodiments, both provided text and free-response utterances are requested in each stage. In some embodiments, the variety of speech utterances collected during enrollment are aggregated into an enrollment voiceprint which captures the speech diversity and thereby ensures robustness to speech variations during the inference phase or process.

For the purposes of summarizing the disclosure, certain aspects, advantages, and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

BRIEF DESCRIPTION OF THE DRAWINGS

Referring now to the drawings in which like reference numbers represent corresponding parts throughout.

DETAILED DESCRIPTION

Introduction

One mode or phase of speaker authentication and identification systems is an enrollment process. In this enrollment process an authorized user submits speech samples along with registration information (such as their identity). These enrollment speech samples submitted by a particular user are analyzed to generate a dedicated voiceprint for that user. This user voiceprint and registration information are combined and stored in an enrollment database of authorized users.

Once an enrollment database is established for a speaker authentication and identification system, the system can be deployed in inference mode. During the inference process, a new speech sample is submitted to the system. The new speech sample is analyzed to generate a representation of the speech sample in the same representation domain as the enrolled-user voiceprints. The representation of the new speech sample is then compared to the enrolled-user voiceprints to determine if the representation is sufficiently similar to any of the enrolled-user voiceprints. If the representation of the speech sample is sufficiently similar to any of the enrolled-user voiceprints then the speech sample is classified as a match to an authorized user. The system responds in accordance with the match determination. For instance, in an account access scenario, if a match is indicated, the system allows access to the requested account; if a match is not indicated, access is denied.

Accurate inference is highly desirable for speaker authentication and identification systems. This means that when an enrolled user submits a speech sample, the system should authenticate or identify that user. On the other hand, when a user who is not enrolled submits a speech sample, the system should determine that the user is not in the enrolled group. In other words, that the user is not authorized or known. An important consideration in speaker authentication and identification systems is that a user may speak in a different way for different speech samples submitted for authentication or identification. In order for a system to achieve accurate and robust inference, an enrollment voiceprint for each user must account for such potential variability in the user's speech such that a range of different speech submitted by an enrolled user for authentication or identification will still be matched with the enrollment voiceprint for that user. The enrollment voiceprint is the voiceprint of a particular speaker that is used to enroll the speaker in an enrollment database. An authentication voiceprint is the voiceprint of a user or speaker requesting authentication. The authentication voiceprint obtained from the user or speaker during the authentication process is compared to a plurality of enrollment voiceprints stored in the enrollment database. If the authentication voiceprint matches any of the plurality of enrollment voiceprints then the requesting user or speaker is authenticated.

Speaker authentication and speaker identification systems may be text-dependent or text-independent. In text-dependent systems, a specific word or phrase or sentence, sometimes referred to as a key phrase, is used for authentication or identification of a user. In some cases, a common key phrase may be used for all users. In other cases, a different key phrase may be used for different users. For instance, in some systems, each enrolling user may select their own key phrase. In text-dependent systems, even though a specific key phrase is used for authentication or identification, a user may speak that phrase in different ways. In order to account for such variability, a text-dependent system may collect multiple examples of the key phrase from an enrolling user. The variability among the multiple examples may be represented in the user's voiceprint.

In text-independent speaker identification and authentication systems, no restrictions are placed on the speech submitted to the inference process. In other words, there is no dedicated key phrase. Any speech may be used for authentication or identification. Since there are no restrictions on the key phrase, in order to achieve robust and accurate inference a wide range of potential speech types must be represented in the user's voiceprint. Embodiments of the voice authentication and identification system and method disclosed herein address this need by structuring the enrollment process so as to elicit a range of different speech types from an enrolling user. Incorporating a range of different speech patterns in the enrolled user voiceprint during the enrollment process improves the robustness and accuracy of the inference process.

Overview

Figure 1:
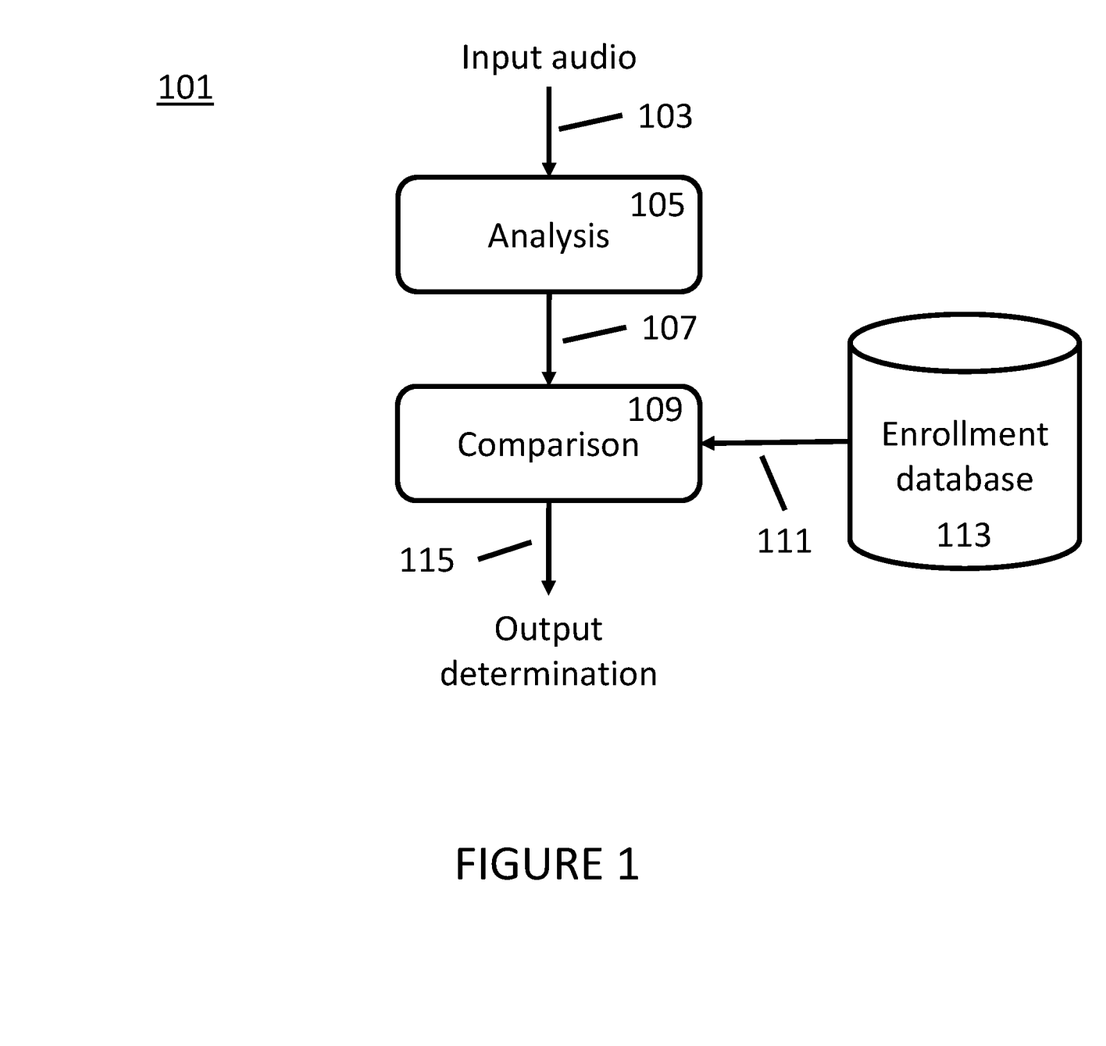
FIG. 1 illustrates a multi-stage enrollment voice authentication and identification system in accordance with embodiments disclosed herein.

In accordance with some embodiments, FIG. 1 illustrates a multi-stage enrollment voice authentication and identification system 101. The system 101 receives input audio on line 103, for instance via a microphone and subsequent analog-to-digital conversion (not depicted), as will be understood by those of ordinary skill in the art. The input audio may consist of silence, speech, background noise, other types of sound sources, or combinations thereof. The input audio is input to an analysis unit 105. In some embodiments, the analysis unit 105 forms a target speech signal for further analysis. In some embodiments, the target speech signal is formed from segments of the input signal. In some embodiments, as will be understood by those of ordinary skill in the art, the analysis unit 105 uses a voice activity detector (not shown) to identify segments of the input audio that contain speech content. In some of these embodiments these identified segments form the target voiceprint signal.

After forming the target speech signal from the input audio signal, the analysis unit 105 computes a representation of the target speech signal. In some embodiments, the computation of the representation includes a feature extraction technique. In some embodiments, the computation of the representation uses a deep neural network. The representation of the target speech signal computed by the analysis unit 105 will be referred to in this document as an embedding or voiceprint.

The representation of the target speech signal computed by the analysis unit 105 is provided on line 107 to comparison unit 109. On line 111, the comparison unit 109 further receives a database of one or more voiceprints from an enrollment database 113. Each of the one or more voiceprints corresponds to an enrolled speaker. The comparison unit 109 compares the target speech signal with each of the voiceprints from enrollment database 113 to make an output determination.

In some embodiments, the comparison between voiceprints corresponds to a correlation computation. In some embodiments, the comparison between voiceprints corresponds to an inner product between vectors. An output determination shown in FIG. 1 is provided by the system 101 on line 115. In embodiments designed for voice identification, the output determination can be an indication of the identity of the input speaker as selected from among the identities of the enrolled speakers based on the comparison carried out in the comparison unit 109. In embodiments designed for voice authentication, the output determination is a binary indicator as to whether the input speaker belongs to the set of enrolled speakers.

Inference Process

Figure 2:
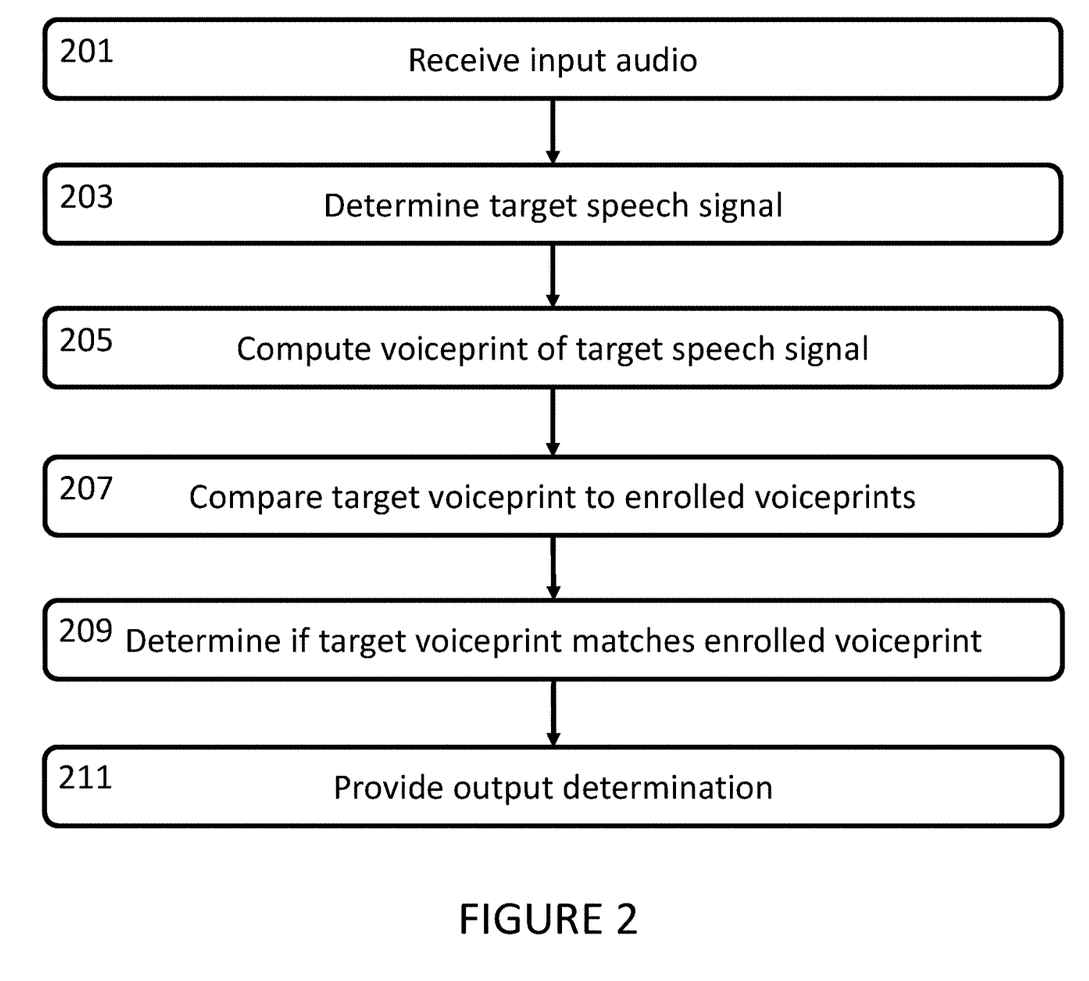
FIG. 2 illustrates a general flow diagram of an inference process for the multi-stage enrollment voice authentication and identification system shown in FIG. 1.

FIG. 2 illustrates a general flow diagram of an inference process for the multi-stage enrollment voice authentication and identification system 101 shown in FIG. 1. The process begins by receiving input audio (box 201). This includes transduction from the acoustic domain into an electrical domain, for instance by a microphone, and conversion to a suitable domain for subsequent processing, for instance by an analog-to-digital converter. Next, the analysis unit 105 determines the target speech signal based on the input audio (box 203). In some embodiments, the target speech signal is determined by identifying and retaining segments of the input audio signal that contain speech content and identifying and discarding segments of the input audio signal which do not contain speech content and instead consist of silence or background noise.

The analysis unit 105 also computes a feature-space representation or voiceprint of the target speech signal (box 205). In some embodiments, the target feature-space representation is computed by extracting and aggregating features from the target speech signal. In some embodiments this is in a vector form. In some embodiments, the target feature-space representation is computed by providing the target speech signal as input to a processing system which includes a deep neural network (DNN). In some embodiments, a processing stage to convert the target speech signal into a set of DNN input features may precede processing by the DNN.

In some embodiments, the DNN is configured to compute a vector representation of the target speech signal. In yet additional embodiments, a normalization stage is included at the output of the DNN such that the vector representation has unit norm. Such a vector representation will be referred to as a voiceprint.

The inference process continues by computing a voiceprint for the target speech signal (or target voiceprint) and comparing it to a set of one or more voiceprints corresponding respectively to one or more enrolled users (box 207). In some embodiments, the comparison between the target voiceprint and an enrolled-user voiceprint is computed as a correlation between a vector representation of the target voiceprint (or the voiceprint of the target speech signal) and a vector representation of the enrolled-user voiceprint.

The comparisons computed between the target voiceprint and an enrolled-user voiceprint are analyzed to determine if the target voiceprint matches any of the enrolled-user voiceprints (box 209). In some embodiments, this analysis is based on comparing correlations computed between a target voiceprint vector and enrolled-user voiceprint vectors to a threshold. In some embodiments, if a correlation exceeds an established threshold it is determined that the target voiceprint vector constitutes a match to the enrolled-user voiceprint vector to a degree for which the correlation exceeds the threshold. In some embodiments, if more than one correlation exceeds an established threshold, it is determined that the target voiceprint vector constitutes a match to the enrolled-user voiceprint vector with a maximum correlation.

The inference process then makes an output determination (box 211). In embodiments of the system 101 designed for speaker identification, the output determination is the speaker identity corresponding to the enrolled-user voiceprint vector determined to match the target voiceprint vector. In embodiments designed for speaker authentication, the output determination is a binary indication (such as "yes" or "no") of whether or not the target voiceprint vector matches any of the enrolled-user voiceprint vectors. In some embodiments this binary indication is used, for example, to determine whether a particular action is carried out or not. For instance, if the target voiceprint vector matches an enrolled-user voiceprint vector in a home door-lock application, an affirmative authentication may signal the door to unlock to permit the authenticated user to enter.

Multi-Stage Enrollment Process

A wide range of potential speech types is achieved in embodiments of the system and method by having a user speak various types of sentences during the multi-stage enrollment process. These sentence types can be categorized as declarative, imperative, interrogative, or exclamatory. Embodiments of the multi-stage enrollment voice authentication and identification system and method disclosed herein elicit one or more sample sentences from one or more of these categories spoken by the enrolling user during the enrollment process. In some embodiments an enrolling user is prompted to submit one or more samples of the enrolling user speaking a declarative sentence, or in other words a statement. In some embodiments the enrolling user is prompted to submit one or more samples of the enrolling user speaking an imperative sentence, or in other words a command. In some embodiments the enrolling user is prompted to submit one or more examples of the enrolling user speaking an interrogative sentence, or in other words a question. In some embodiments the enrolling user is prompted to submit one or more samples of the enrolling user speaking an exclamatory sentence, or in other words an exclamation. Embodiments of the system and method disclosed herein improve upon existing approaches by eliciting and incorporating multiple types of sentences during the enrollment process.

Figure 3:
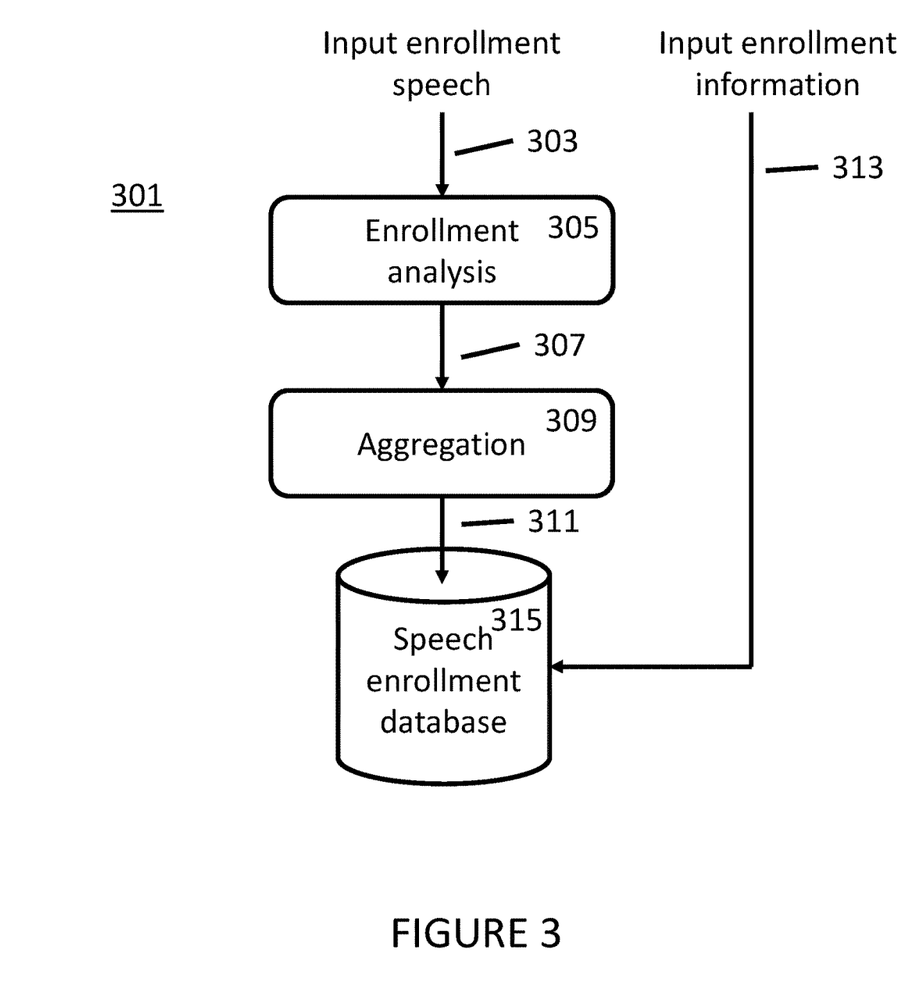
FIG. 3 is a block diagram of a user multi-stage enrollment system in accordance with some embodiments of the voice authentication and identification system.

FIG. 3 is a block diagram of a user multi-stage enrollment system 301 in accordance with some embodiments of the multi-stage enrollment voice authentication and identification system 101. As shown in FIG. 3, input enrollment speech is provided on line 303 to an enrollment analysis unit 305. In some embodiments, the enrollment analysis unit 305 of the user multi-stage enrollment system 301 operates similarly to the analysis unit 105 depicted in FIG. 1. In these embodiments the analysis unit 305 determines a target speech signal from the input enrollment speech provided on line 303 and computes a target voiceprint for the target speech signal.

The target voiceprint then is provided on line 307 to an aggregation unit 309. In some embodiments more than one example of input enrollment speech is acquired from the enrolling user. For each example of input enrollment speech, the analysis unit 305 computes a corresponding example voiceprint, such as an example voiceprint vector. Each example voiceprint vector is provided in turn on line 307 to the aggregation unit 309. In some embodiments, the aggregation unit 309 computes a centroid of the one or more example voiceprint vectors received on line 307 for an enrolling user. In this manner a target voiceprint for the enrolling user is formed. In other embodiments, the one or more example voiceprint vectors for an enrolling user are aggregated in a different manner to form a target voiceprint for the enrolling user. The aggregation unit 309 provides the target voiceprint for the enrolling user on line 311 to a speech enrollment database 315. In some embodiments, the speech enrollment database 315 further receives corresponding input enrollment information on line 313. By way of example, this corresponding input enrollment information may include the user's name or some other identifying information corresponding to the enrolling user.

Figure 4:
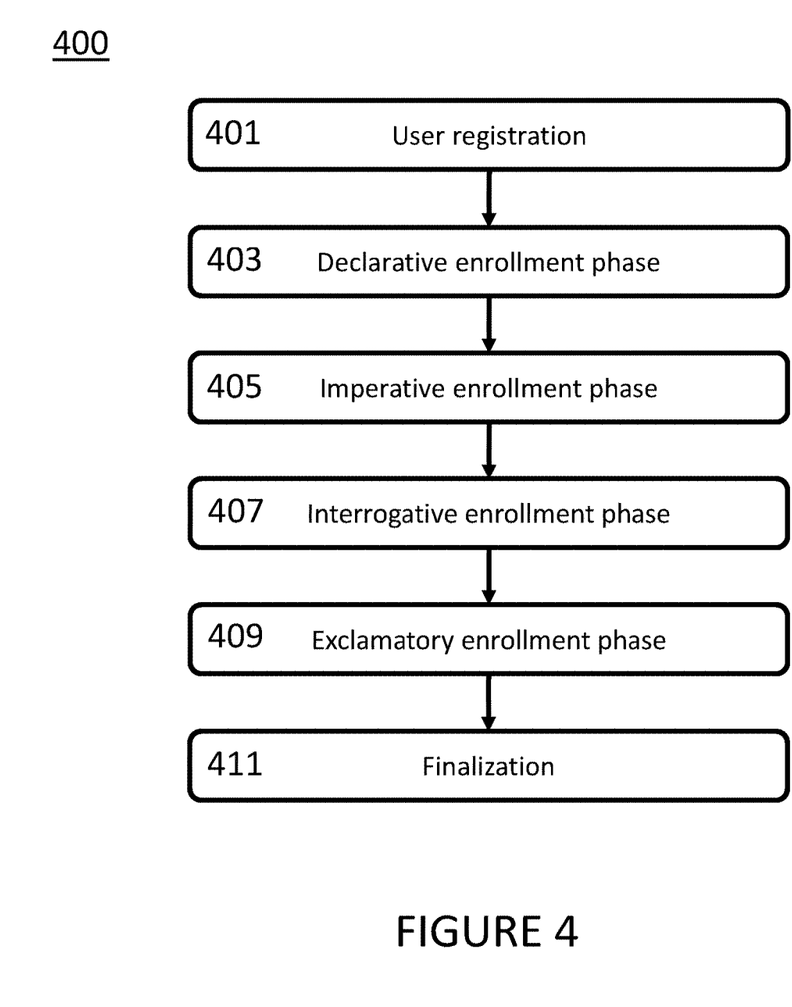
FIG. 4 illustrates a general flow diagram of a multi-stage enrollment process for the multi-stage enrollment voice authentication and identification system shown in FIG. 1.

FIG. 4 illustrates a general flow diagram of an enrollment process for the multi-stage enrollment voice authentication and identification system 101 shown in FIG. 1. In general, embodiments of the multi-stage enrollment process provide an enrollment interface that guides the enrolling speaker through enrollment. Whereas FIG. 3 depicts the processing carried out on enrollment speech utterances, FIG. 4 depicts the control flow for eliciting speech utterances from the enrolling speaker and obtaining the input enrollment speech shown in FIG. 3.

As will be understood by those of ordinary skill in the art, sentences may be categorized into various sentence types, including declarative, imperative, interrogative, and exclamatory sentences. When spoken, each of these sentence types may elicit a different type of speaking pattern. Moreover, different types of speaking patterns may correspond to different speech representations in the voiceprint feature space or feature domain. In accordance with certain embodiments, the voiceprint of a user may be more robust to arbitrary authentication utterances by that user if a variety of different speech patterns are incorporated in the enrollment voiceprint. Embodiments of the enrollment interface are therefore configured to elicit different types of spoken sentences in order to result in a voiceprint that more completely represents the enrolling speaker's range of speech patterns.

Referring to FIG. 4, the multi-stage enrollment process begins by collecting registration information about the enrolling user, such as the user's name (box 401). Next, the multi-stage enrollment process requests that the enrolling user speak one or more sentences of the declarative type (box 403). These declarative utterances are captured and processed to generate one or more corresponding feature-domain representations. The multi-stage enrollment process also requests that the enrolling user speak one or more sentences of the imperative type (box 405). These imperative utterances are captured and processed to generate one or more corresponding feature-domain representations.

The multi-stage enrollment process also requests that the enrolling user speak one or more sentences of the interrogative type (box 407). These interrogative utterances are captured and processed to generate one or more corresponding feature-domain representations. The multi-stage enrollment process also requests that the enrolling user speak one or more sentences of the exclamatory type (box 409). These exclamatory utterances are captured and processed to generate one or more corresponding feature-domain representations.

While FIG. 4 illustrates eliciting four different types of speech in accordance with some embodiments of the invention, those of ordinary skill in the art will understand that a different number or variety of types of these sentence types or other types of speech, in any combination, can be used. In addition, although the four types of sentence types are shown a particular order, any order or combination of orders can be used. Moreover, each of four sentence types may be simultaneously presented to the user. The multi-stage enrollment process is finalized by aggregating the feature-domain representations generated in the various preceding enrollment phases to obtain an aggregated voiceprint (box 411). As shown FIG. 3, this process is performed by the aggregation unit 309. In some embodiments the finalization process includes coupling the aggregated voiceprint with the user registration information collected and storing the coupled voiceprint and user registration information in the speech enrollment database 315.

Figure 5A:
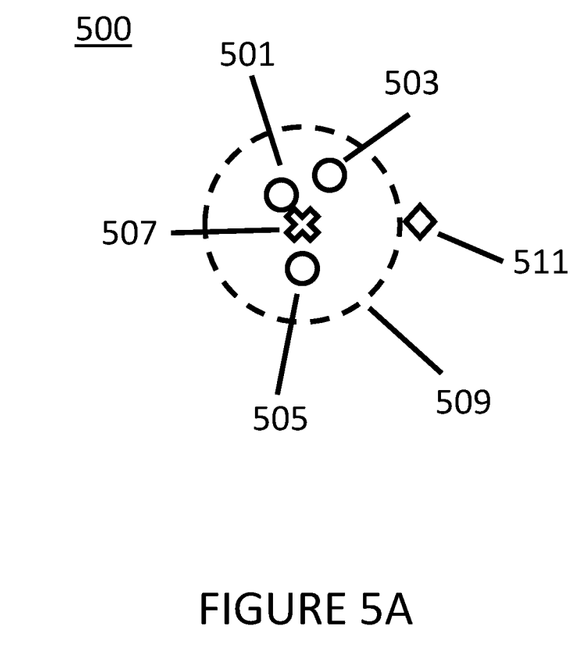
FIG. 5A illustrates a first example of a feature-domain representation of multi-stage enrollment and inference in the multi-stage enrollment voice authentication and identification system.

FIG. 5A illustrates a first example of a feature-domain or feature-space representation of multi-stage enrollment and inference in the multi-stage enrollment voice authentication and identification system 101. As shown in FIG. 5A, in some embodiments, speech examples are represented in a feature space 500. Speech example representations 501, 503, and 505 correspond to speech examples provided by a user during the multi-stage enrollment process. A feature-domain representation indicates a first user voiceprint 507, which is generated by aggregating the speech example representations 501, 503, and 505. By way of example, this aggregation can be performed by the aggregation unit 309, shown in FIG. 3.

Figure 5B:
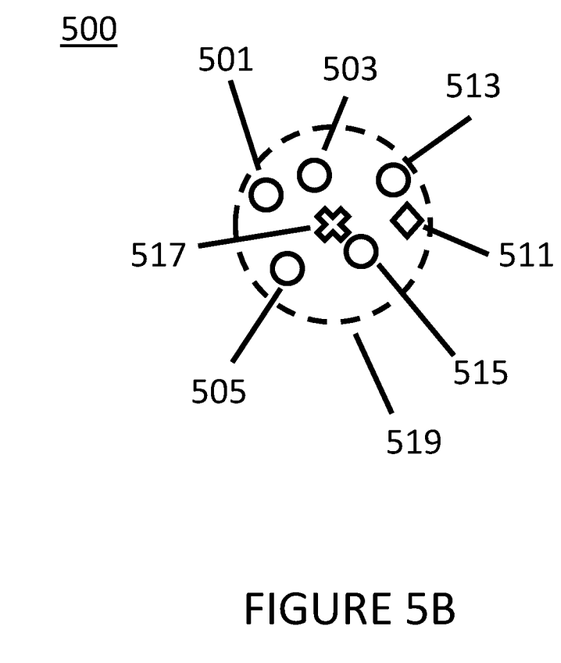
FIG. 5B illustrates a second example of a feature-domain representation of multi-stage enrollment and inference in the multi-stage enrollment voice authentication and identification system.

A first boundary 509 (shown in FIG. 5A by the dashed circle) indicates a decision threshold associated with the first user voiceprint 507. During the inference process, speech example representations submitted for authentication that are within the boundary 509 are determined to be a match to the first user voiceprint 507. Conversely, speech example representations outside of the first boundary 509 are determined to not be a match to the first user voiceprint 507. As shown in FIG. 5A, a feature-domain representation of a speech submission 511 is located outside of the first boundary 509. This speech submission 511 may be submitted by the user or by someone else for authentication or identification purposes. As shown in FIG. 5B, because the speech submission 511 falls outside of the first boundary 509 it is determined to not be a match to the first user voiceprint 507.

As an example of the limitations of some existing speaker authentication and identification systems, for purposes of this example only, assume that the speech example representations 501, 503, and 505 all correspond to a single type of sentence (such as a declarative sentence) in accordance with a single-type enrollment process used by existing speaker authentication and identification systems. Assume further that the speech submission corresponds to a different type of speech than the enrollment type. For example, assume that the speech submission 511 corresponds to an interrogative sentence (and not a declarative sentence) but was spoken by the same user represented by the first user voiceprint 507. Ideally, the existing speaker authentication and identification systems should determine that the speech submission 511 matches the first user voiceprint 507. However, because only a single type of sentence was used in the enrollment process, existing speaker authentication and identification systems instead determine that it is not a match.

Again, this inaccurate determination occurs because the speech type (interrogative sentence) of the speech submission 511 is different from the speech type (declarative sentence) of the speech example representations 501, 503, and 505. This results in the speech submission 511 being outside of the first boundary 509 and too far in the feature space from the first user voiceprint 507 to be correctly classified as a match. As will be appreciated, embodiments of the system 101 and method disclosed herein avoid this misclassification and improve accuracy by using more than one type of sentence during the enrollment process. As will be understood by those of ordinary skill in the art, the illustration in FIG. 5A depicts a two-dimensional representation of a feature domain or feature space for speech representation whereas in embodiments of the system and method disclosed herein the dimensionality of the feature domain or feature space for speech representation may be greater than two.

FIG. 5B illustrates a second example of a feature-domain representation of multi-stage enrollment and inference in the multi-stage enrollment voice authentication and identification system 101. In the feature space 500 of this second example, speech example representations 501, 503, and 505 are incorporated in the enrollment process as in the first example shown in FIG. 5A. In addition, in this second example, speech example representations 513 and 515 are also incorporated into the enrollment process. A feature-domain representation corresponding to a second user voiceprint 517 is generated by aggregating the speech example representations 501, 503, 505, 513, and 515. By way of example, this aggregation can be performed by the aggregation unit 309, shown in FIG. 3.

A second boundary 519 (illustrated in FIG. 5B by the dashed circle) indicates a decision threshold associated with the second user voiceprint 517. During the inference process, speech submissions within the second boundary 519 are determined to be a match to the second user voiceprint 517. Conversely, examples outside of the second boundary 519 are determined to not be a match to the second user voiceprint 517. The speech submission 511 is a feature-domain representation of a speech example submitted by a user for authentication or identification, as in FIG. 5A. As shown in FIG. 5B, because the speech submission 511 falls inside the second boundary 519, the speech submission is determined to be a match to second user voiceprint 517.

As an example of the robustness and accuracy of embodiments of the system 101 and method disclosed herein, assume that the speech example representations 501, 503, and 505 all correspond to a particular type of sentence, such as declarative sentence. Assume further that the speech example representations 513 and 515 correspond to a different type of sentence, such as an interrogative sentence. Also assume that the speech submission 511 submitted for authentication or identification corresponds to an interrogative sentence. Because the enrollment process in this example shown in FIG. 5B included the speech examples 513 and 515 (for instance corresponding to interrogative sentences), the second user voiceprint 517 in the example of FIG. 5B is more representative of the possible varieties of the enrolled user's speech than the first user voiceprint 507 in the example of FIG. 5A.

In the example of FIG. 5B, the inference determines correctly that the speech submission 511 is a match to the second user voiceprint 517. This accurate determination occurs because the speech type of the speech submission 511 is adequately captured by the speech example representations 501, 503, 505, 513, and 515, resulting in the speech submission 511 being inside the second boundary 519 and close enough in the feature space to the second user voiceprint 517 to be correctly classified as a match. As will be understood by those of ordinary skill in the art, the illustration in FIG. 5B depicts a two-dimensional representation of a feature domain or feature space for speech representation whereas in embodiments of the system and method disclosed herein the dimensionality of the feature domain or feature space for speech representation may be greater than two.

Alternate Embodiments and Exemplary Operating Environment

Many other variations than those described herein will be apparent from this document. For example, depending on the embodiment, certain acts, events, or functions of any of the methods and algorithms described herein can be performed in a different sequence, can be added, merged, or left out altogether (such that not all described acts or events are necessary for the practice of the methods and algorithms). Moreover, in certain embodiments, acts or events can be performed concurrently, such as through multi-threaded processing, interrupt processing, or multiple processors or processor cores or on other parallel architectures, rather than sequentially. In addition, different tasks or processes can be performed by different machines and computing systems that can function together.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The various illustrative logical blocks and modules described in connection with the embodiments disclosed herein can be implemented or performed by a machine, such as a general purpose processor, a processing device, a computing device having one or more processing devices, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor and processing device can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Embodiments of the multi-stage enrollment voice authentication and identification system and method described herein are operational within numerous types of general purpose or special purpose computing system environments or configurations. In general, a computing environment can include any type of computer system, including, but not limited to, a computer system based on one or more microprocessors, a mainframe computer, a digital signal processor, a portable computing device, a personal organizer, a device controller, a computational engine within an appliance, a mobile phone, a desktop computer, a mobile computer, a tablet computer, a smartphone, and appliances with an embedded computer, to name a few.

Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, and so forth. In some embodiments the computing devices will include one or more processors. Each processor may be a specialized microprocessor, such as a digital signal processor (DSP), a very long instruction word (VLIW), or other micro-controller, or can be conventional central processing units (CPUs) having one or more processing cores, including specialized graphics processing unit (GPU)-based cores in a multi-core CPU.

The process actions or operations of a method, process, or algorithm described in connection with the embodiments disclosed herein can be embodied directly in hardware, in a software module executed by a processor, or in any combination of the two. The software module can be contained in computer-readable media that can be accessed by a computing device. The computer-readable media includes both volatile and nonvolatile media that is either removable, non-removable, or some combination thereof. The computer-readable media is used to store information such as computer-readable or computer-executable instructions, data structures, program modules, or other data. By way of example, and not limitation, computer readable media may comprise computer storage media and communication media.

Computer storage media includes, but is not limited to, computer or machine readable media or storage devices such as Bluray discs (BD), digital versatile discs (DVDs), compact discs (CDs), floppy disks, tape drives, hard drives, optical drives, solid state memory devices, RAM memory, ROM memory, EPROM memory, EEPROM memory, flash memory or other memory technology, magnetic cassettes, magnetic tapes, magnetic disk storage, or other magnetic storage devices, or any other device which can be used to store the desired information and which can be accessed by one or more computing devices.

A software module can reside in the RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an application specific integrated circuit (ASIC). The ASIC can reside in a user terminal. Alternatively, the processor and the storage medium can reside as discrete components in a user terminal.

The phrase "non-transitory" as used in this document means "enduring or long-lived". The phrase "non-transitory computer-readable media" includes any and all computer-readable media, with the sole exception of a transitory, propagating signal. This includes, by way of example and not limitation, non-transitory computer-readable media such as register memory, processor cache and random-access memory (RAM).

The phrase "audio signal" is a signal that is representative of a physical sound.

Retention of information such as computer-readable or computer-executable instructions, data structures, program modules, and so forth, can also be accomplished by using a variety of the communication media to encode one or more modulated data signals, electromagnetic waves (such as carrier waves), or other transport mechanisms or communications protocols, and includes any wired or wireless information delivery mechanism. In general, these communication media refer to a signal that has one or more of its characteristics set or changed in such a manner as to encode information or instructions in the signal. For example, communication media includes wired media such as a wired network or direct-wired connection carrying one or more modulated data signals, and wireless media such as acoustic, radio frequency (RF), infrared, laser, and other wireless media for transmitting, receiving, or both, one or more modulated data signals or electromagnetic waves. Combinations of the any of the above should also be included within the scope of communication media.

Further, one or any combination of software, programs, computer program products that embody some or all of the various embodiments of the multi-stage enrollment voice authentication and identification system and method described herein, or portions thereof, may be stored, received, transmitted, or read from any desired combination of computer or machine readable media or storage devices and communication media in the form of computer executable instructions or other data structures.

Embodiments of the multi-stage enrollment voice authentication and identification system and method described herein may be further described in the general context of computer-executable instructions, such as program modules or units, being executed by a computing device. Generally, program modules or units include routines, programs, objects, components, data structures, and so forth, which perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the scope of the disclosure. As will be recognized, certain embodiments of the inventions described herein can be embodied within a form that does not provide all of the features and benefits set forth herein, as some features can be used or practiced separately from others.

What is claimed is:

1. A method for enrolling a user in a multi-stage enrollment voice authentication or identification system, comprising:
    capturing a plurality of speech samples of the user's speech to obtain user speech samples';
    categorizing the plurality of speech samples into the following sentence types: (1) a declarative sentence; (2) an imperative sentence; (3) an interrogative sentence; (4) an exclamatory sentence;
    computing feature-space representations for each of the sentence types, wherein a boundary is determined for the feature-space representations for each of the sentence types;
    generating a user enrollment voiceprint by aggregating the feature-space representations, wherein the aggregated feature-space representations include at least two different sentence types, wherein the aggregated feature-space representations have a modified boundary;
    associating the user enrollment voiceprint with user information; and
    storing the user enrollment voiceprint and associated user information in a database of enrolled users.

2. The method of claim 1, wherein the plurality of speech samples includes a free-response example wherein the user is not reading aloud a specified sentence.

3. The method of claim 1, further comprising:
    capturing a speech sample of the user requesting authentication or identification;
    generating a voiceprint for the requesting user;
    determining whether a requesting user voiceprint matches any enrolled-user voiceprints in the database of enrolled users.

4. The method of claim 3, wherein determining whether the requesting user voiceprint matches any enrolled-user voiceprints in the database of enrolled users further comprises:
    computing correlations between a requesting user voiceprint vector and enrolled-user voiceprint vectors; and
    comparing the correlations to a threshold.

5. The method of claim 4, further comprising:
    determining that the requesting user voiceprint and at least one of the enrolled-user voiceprints is a match if one of the correlations exceeds the threshold.

6. The method of claim 5, further comprising:
    determining that two or more of the correlations exceeds the threshold; and
    determining that a one of the enrolled-user voiceprints having a maximum correlation is a match to the requesting user voiceprint.

7. The method of claim 4, further comprising:
    determining that no match exists between the requesting user voiceprint and the enrolled-user voiceprints if none of the correlations exceeds the threshold.

8. A method for matching a speaker in a multi-stage enrollment voice authentication or identification system, comprising:
    capturing a plurality of speech samples from the speaker during an enrollment process,
    categorizing the plurality of speech samples into the following sentence types: (1) a declarative sentence; (2) an imperative sentence; (3) an interrogative sentence; (4) an exclamatory sentence;
    computing feature-space representations for each of the sentence types, wherein a boundary is determined for the feature-space representations for each of the sentence types;
    generating an enrollment voiceprint for the speaker by aggregating the features-space representations using at least two different categorized sentence types to obtain a speaker enrollment voiceprint, wherein the aggregated feature-space representations have a modified boundary;
    associating the speaker enrollment voiceprint with information about the speaker gathered during enrollment;
    inputting an input audio signal containing speech samples of the speaker;
    determining a target speech signal by identifying and retaining segments of the input audio signal that contain speech and identifying and discarding segments of the input audio signal which do not contain speech;
    computing an authentication voiceprint for the speaker from the target speech signal and comparing the speaker authentication voiceprint to a set of one or more enrolled-user voiceprints corresponding to one or more enrolled users to obtain a comparison;
    making an output determination based on the comparison to determine whether the speaker is a match with an enrolled user; and
    making a decision based on whether the speaker is a match.

9. The method of claim 8, wherein the set of one or more enrolled-user voiceprints includes the speaker enrollment voiceprint.

10. The method of claim 9, further comprising:
    determining that the comparison is a match between the speaker authentication voiceprint and the speaker enrollment voiceprint; and wherein making a decision based on whether the speaker is a match further comprises making the decision based on there being a positive match.

11. The method of claim 8, wherein computing an authentication voiceprint for the speaker from the target speech signal further comprises providing the target speech signal as input to a processing system which includes a deep neural network (DNN).

12. The method of claim 11, wherein the deep neural network is configured to compute a vector representation of the target speech signal and wherein the vector representation of the target speech signal is the speaker authentication voiceprint.

13. The method of claim 11, further comprising normalizing the output of the deep neural network such that the vector representation has unit norm.

14. The method of claim 8, wherein comparing the speaker authentication voiceprint to a set of one or more enrolled-user voiceprints corresponding to one or more enrolled users further comprises computing a correlation between a vector representation of the speaker authentication voiceprint and vector representations of each of the enrolled-user voiceprints.

15. The method of claim 14, further comprising:
determining that the correlation exceeds a threshold; and
determining that the speaker authentication voiceprint is a match with at least one of the enrolled-user voiceprints for which the correlation exceeds a threshold.

16. The method of claim 14, further comprising:
determining that the speaker is positively authenticated as an enrolled user; and
making a decision based on the authentication of the speaker.

17. The method of claim 14, further comprising:
determining that the speaker is positively identified as an enrolled user; and
making a decision based on the identity of the speaker.

* * * * *